United States Patent
Doll et al.

(10) Patent No.: US 12,311,395 B2
(45) Date of Patent: May 27, 2025

(54) METHOD FOR PRESERVING CAVITIES, MIXING NOZZLE UNIT AND CAVITY-PRESERVING DEVICE HAVING A MIXING NOZZLE UNIT OF THIS TYPE

(71) Applicant: IPR—Intelligente Peripherien für Roboter GmbH, Eppingen (DE)

(72) Inventors: Fredy Doll, Achern (DE); Marc Engelhart, Sinsheim (DE)

(73) Assignee: IPR—INTELLIGENTE PERIPHERIEN FÜR ROBOTER GMBH, Eppingen (DE)

( * ) Notice: Subject to any disclaimer, the term of this patent is extended or adjusted under 35 U.S.C. 154(b) by 573 days.

(21) Appl. No.: 17/415,320

(22) PCT Filed: Nov. 6, 2019

(86) PCT No.: PCT/EP2019/080438
§ 371 (c)(1),
(2) Date: Jun. 17, 2021

(87) PCT Pub. No.: WO2020/126199
PCT Pub. Date: Jun. 25, 2020

(65) Prior Publication Data
US 2022/0062937 A1 Mar. 3, 2022

(30) Foreign Application Priority Data
Dec. 18, 2018 (EP) .................................... 18213643

(51) Int. Cl.
*B05B 13/06* (2006.01)
*B05B 3/02* (2006.01)
(Continued)

(52) U.S. Cl.
CPC .......... *B05B 13/0636* (2013.01); *B05B 3/027* (2013.01); *B05B 7/066* (2013.01); *B05B 15/652* (2018.02); *B05B 15/68* (2018.02)

(58) Field of Classification Search
None
See application file for complete search history.

(56) References Cited

U.S. PATENT DOCUMENTS

| | | | | |
|---|---|---|---|---|
| 3,120,346 A | * | 2/1964 | Willhoite | B05B 3/02 239/214.15 |
| 4,370,944 A | * | 2/1983 | Nagata | B05B 7/066 118/317 |

(Continued)

FOREIGN PATENT DOCUMENTS

| | | |
|---|---|---|
| CN | 1781612 A | 6/2006 |
| CN | 101992039 A | 3/2011 |

(Continued)

OTHER PUBLICATIONS

Chinese Office Action with English translation issued in corresponding Chinese Application No. 201980084370.9, dated Jun. 1, 2022 (32 pages).

(Continued)

*Primary Examiner* — Alexander M Weddle
(74) *Attorney, Agent, or Firm* — FLYNN THIEL, P.C.

(57) ABSTRACT

A method for preserving cavities by applying a protective layer to the interior of a hollow body. The method uses a mixing nozzle unit coupled to a rotor unit. The mixing nozzle unit is rotated about an axis of rotation and has a mixing nozzle. The mixing nozzle unit has two supply channels for the cavity preservative and for gas for atomizing the cavity preservative. The supply channels run in the direction of the axis of rotation and conduct cavity preservative and atomizing gas separately to the mixing nozzle. The mixing nozzle unit is inserted into the hollow body in (Continued)

the direction of the axis of rotation through an opening in the hollow body. The cavity preservative is discharged in atomized form, and the mixing nozzle unit is rotated about the axis of rotation relative to the hollow body during the discharging or between a plurality of discharging phases.

7 Claims, 5 Drawing Sheets

(51) Int. Cl.
  *B05B 7/06* (2006.01)
  *B05B 15/652* (2018.01)
  *B05B 15/68* (2018.01)

(56) References Cited

U.S. PATENT DOCUMENTS

| | | |
|---|---|---|
| 6,206,300 B1 | 3/2001 | Roudebush et al. |
| 6,632,475 B1 | 10/2003 | Bleggi |
| 9,138,766 B2 | 9/2015 | Ströhlein et al. |
| 9,500,463 B2 | 11/2016 | Killingbeck et al. |
| 9,987,668 B2 | 6/2018 | Kjellberg et al. |
| 10,065,200 B2 | 9/2018 | Hiemer |
| 10,870,124 B2 | 12/2020 | Doll et al. |
| 11,376,711 B2 | 7/2022 | Linde |
| 2009/0057443 A1* | 3/2009 | Sendo ........................ B08B 1/12 239/405 |
| 2019/0022686 A1* | 1/2019 | Doll ........................ B05B 12/06 |

FOREIGN PATENT DOCUMENTS

| | | |
|---|---|---|
| CN | 202539010 U | 11/2012 |
| CN | 103153484 A | 6/2013 |
| CN | 204816991 U | 12/2015 |
| CN | 105307787 A | 2/2016 |
| CN | 105980106 A | 9/2016 |
| CN | 206305409 U | 7/2017 |
| DE | 102010034921 A1 | 2/2012 |
| EP | 2228136 A2 | 9/2010 |
| FR | 3014334 A3 | 6/2015 |
| JP | 6206025 A | 7/1994 |
| JP | 3699770 B2 | 9/1997 |
| WO | 2017013620 A1 | 1/2017 |
| WO | WO-2017137520 A1 * | 8/2017 ............. B05B 12/06 |

OTHER PUBLICATIONS

Dusen-Schlick GmbH, "Two-Substance Nozzles/ Full-Cone/ External Mixing", Module System Range 970, www.myschlick.com, Jan. 21, 2016, pp. 48-59 (12 pages).

International Search Report with English Translation issued in corresponding International Application No. PCT/EP2019/080438 date of mailing Feb. 12, 2020 (7 pages).

Written Opinion of International Searching Authority issued in corresponding International Application No. PCT/EP2019/080438 dated Feb. 12, 2020 (11 pages).

* cited by examiner

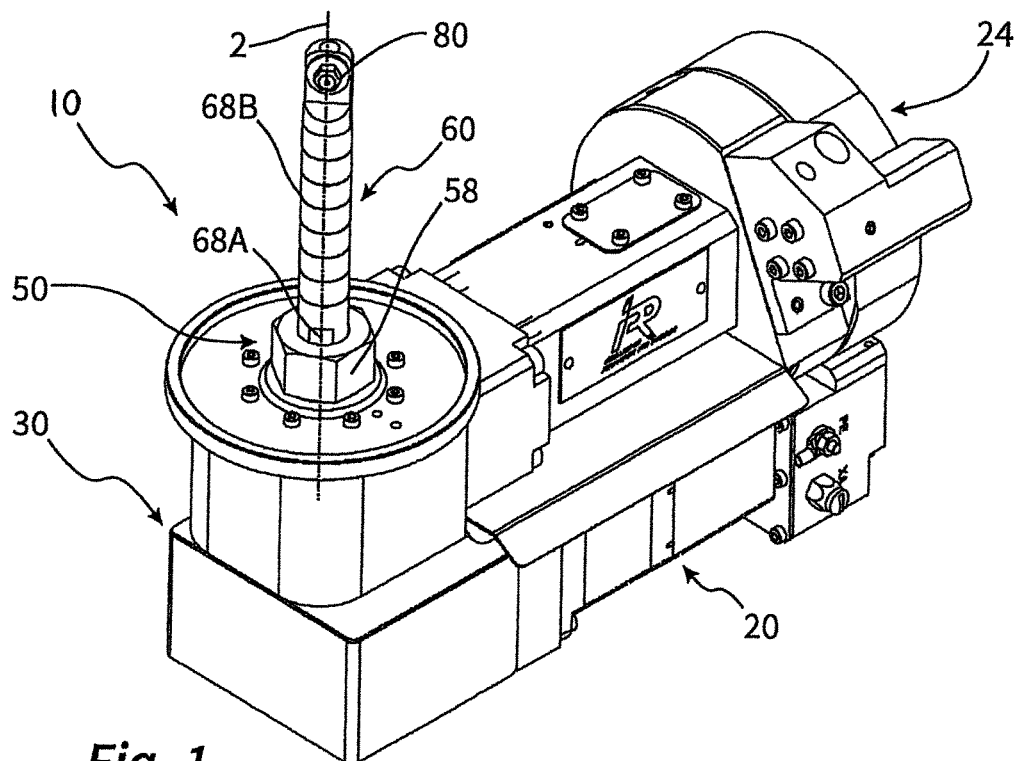
*Fig. 1*
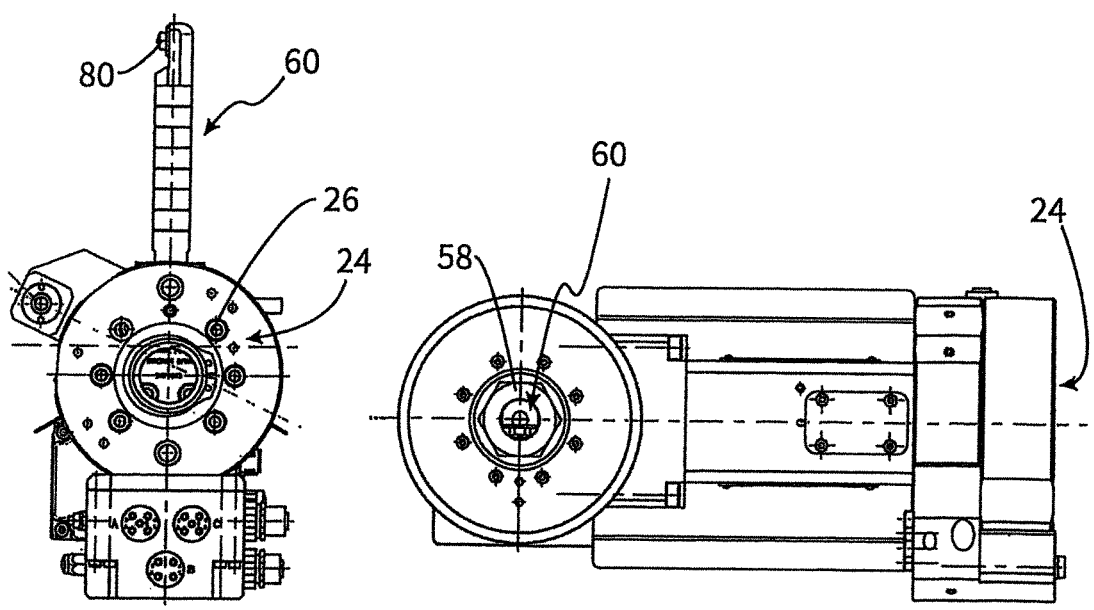
*Fig. 2*  *Fig. 3*

METHOD FOR PRESERVING CAVITIES, MIXING NOZZLE UNIT AND CAVITY-PRESERVING DEVICE HAVING A MIXING NOZZLE UNIT OF THIS TYPE

TECHNICAL FIELD

The invention relates to the field of cavity preservation in the automotive field. Here, the invention relates to a method for the discharge of cavity preserving agent, and to apparatuses which are provided and are suitable for this purpose.

BACKGROUND AND SUMMARY

Methods of this type have been used for a long time in automotive production. In order to protect cavities of the vehicle body against environmental influences and to prevent incipient corrosion on walls of said cavities, the inner surfaces of cavities of this type are covered with a cavity preserving agent. The solidified layer obstructs corrosion. The cavities in question, in the case of which said methods are used, are, in particular, the sills, cavities on the wheel arches and side members and crossmembers of the vehicle.

It is already known from WO 2017/137520 A1 for cavity preserving agent to be discharged in the form of a protective agent mist, that is to say with droplet sizes of <30 μm or even <10 μm. A protective agent mist of this type is not completely deposited directly on the surfaces to be coated, but rather at least in part initially forms a largely stationary mist cloud which has been deposited predominantly only after some time.

The invention relates, in particular, to the field of cavity preservation by means of a protective agent mist of this type.

For the field of the non-atomized discharge of wax or a preserving agent, DE 10 2010 034 921 A1 has disclosed the use of a lance which has a rotatable outer nozzle pipe.

The invention is directed to a method and an apparatus which is suitable to discharge cavity preserving agent, in particular in an atomized or even nebulized form, in such a way that a high quality layer with a layer thickness which can be influenced satisfactorily is formed.

For this purpose, a method for preserving cavities is proposed, which method makes the application of a protective layer consisting of a cavity preserving agent on the inner side of a motor vehicle part which is configured as a hollow body possible. This method preferably takes place with the use of a cavity preserving device according to the invention with a mixing nozzle unit according to the invention, with the result that these aspects of the invention are described together with the method in the further text. Even though the invention relates primarily to motor vehicle parts which are configured as hollow bodies, a comparable method can in principle also be used in other fields.

The method takes place with the utilization of a mixing nozzle unit which is coupled by way of a proximal end to a rotor unit, by means of which it can be rotated about a rotational axis, the mixing nozzle unit having, at a distal end, a mixing nozzle which is oriented radially with respect to the rotational axis. Here, the rotatable mixing nozzle unit has two separate feed channels which extend in the direction of the rotational axis for the cavity preserving agent firstly and for gas for the purpose of the atomization of the cavity preserving agent secondly. The cavity preserving agent and the atomization gas can be conducted separately through the feed channels as far as the mixing nozzle.

Within the context of the method, the mixing nozzle unit is inserted in the direction of the rotational axis through an opening of the hollow body into said hollow body, with the result that at least the mixing nozzle and one or more discharge openings provided on it are situated within the hollow body.

The cavity preserving agent is then discharged in atomized form by means of the mixing nozzle and is deposited on the inner side of the hollow body, the mixing nozzle unit being rotated about the rotational axis with respect to the hollow body during the discharge or between a plurality of discharge phases.

Here, said mixing nozzle is responsible for the atomization of the separately fed fluids, that is to say of the liquid cavity preserving agent and the gaseous atomization medium. The gaseous medium is preferably air. Insofar as the atomization or nebulization with air is mentioned in the further text, this also includes the use of other gases. The liquid cavity preserving agent and/or the gas are/is fed to the mixing nozzle under positive pressure. Here, by way of example, pressures of from 2 bar to 10 bar can be used for the cavity preserving agent, and from 2 bar to 10 bar can also be used for the atomization gas.

The mixing nozzle can have an internal atomization chamber, from which the cavity preserving agent which is atomized or nebulized by means of the gas is discharged through a discharge opening. One design is particularly preferred, however, in the case of which the mixing nozzle is provided for external mixing of air and cavity preserving agent and therefore an external atomization or nebulization. In this case, the mixing nozzle has at least two outlet openings which are oriented in such a way that the exiting cavity preserving agent is atomized downstream of the two outlet openings in the case of gas which exits at the same time.

According to one aspect of the invention, the mixing nozzle is rotated about the rotational axis during discharge, with the result that, starting from an opening, through which the mixing nozzle is introduced into the cavity, the mixing nozzle can output cavity preserving agent in different directions. It preferably rotates at least by 360°, in particular preferably multiple times, during a coating operation. As will still be described in the further text, it is therefore advantageous if the fluid feed means structurally permits an endless rotation.

The rotation of the mixing nozzle is advantageous, in particular, since it has been shown, precisely in the case of the atomization of the cavity preserving agent in mist form, that is to say with mean droplet sizes of <60 μm, preferably <30 μm, in particular preferably <10 μm, that the coating result is also influenced by how great the protective agent mist flow is which is output in the direction of a surface to be coated. The cyclical repeated discharge of a comparatively small protective agent mist flow which becomes possible by way of the multiple rotation in the case of simultaneous discharge leads to an improved protective layer in comparison with the one-time discharge of a greater protective agent mist flow. As a result of the repeated rotation of the mixing nozzle, the cavity preserving agent is deposited in a more homogeneous and reproducible way. A rotational speed between 1 and 10 revolutions per minute is preferably used.

Even if exclusively the atomized or even nebulized discharge of the cavity preserving agent is provided in the case of a method according to one aspect of the invention, the mixing nozzle is preferably also suitable for the output of a non-atomized jet of cavity preserving agent. It can therefore also serve, for example, for the targeted coating of welded seams in the cavity.

The external atomization by way of the mixing nozzle which has already been mentioned above is also advantageous with regard to the non-atomized discharge, since the desired jet can be generated here by way of an interruption of the gas feed.

Said method can in principle be operated with a constant and uninterrupted cavity preserving agent flow at a constant rotational speed of the mixing nozzle. It is advantageous in practice, however, for a discharge to be provided which varies in a manner which is dependent on the angular position, with the result that the identical quantity of the cavity preserving agent is not output in all directions.

It has been shown that this is also advantageous, in particular, in the case of the production of a protective agent mist. Although this initially forms a cloud of droplets which are at first deposited gradually and, as a result, in any case tend toward homogenization, it has been shown that a mist cloud of this type nevertheless leads locally to different layer thicknesses. By way of a varying discharge in a manner which is dependent on the angular position, this can be counteracted in a targeted manner or this can optionally even be used in a targeted manner, in order to locally produce greater layer thicknesses.

Different types of the direction-dependent variation and combinations thereof are possible.

It is provided in the case of one variant that, while the mixing nozzle unit is rotated, the feed of cavity preserving agent to the mixing nozzle varies. This leads, in the case of a rotational movement of the mixing nozzle unit at a constant rotational speed, to said varying discharge per angular region which is swept over. The variation of the fed cavity preserving agent can take place, in particular, via an electrically controlled metering valve.

A particularly simple type of variation exists if a valve is provided which, while the method is being carried out, merely activates the feed of cavity preserving agent in phases and deactivates it in phases. A simple valve, in particular a pneumatically controlled valve, is sufficient for this purpose. The deactivation of the discharge during the rotational movement of the mixing nozzle can be expedient, in particular, if no discharge at all is to take place in an angular region, for example since openings are provided there, through which the protective agent mist or protective agent spray jet would otherwise exit in an undesired manner.

It is particularly advantageous if the angle-dependent cavity preserving agent flow is achieved by virtue of the fact that the rotational speed is varied. In different angular regions, a constant cavity preserving agent flow then leads to a varying quantity of cavity preserving agent per angular region. A method of this type is possible by way of a simply switching valve or possibly even without a valve in the feed channel of the cavity preserving agent, solely by way of the actuation of the preferably electric motor, by means of which the mixing nozzle is rotated.

The mixing nozzle unit which is preferably used for the described method has an elongate stem, at the proximal end of which a coupling device for attaching to a rotor shaft is provided, and which elongate stem extends along a rotational axis which is defined by way of the coupling device. In the region of a distal end, said mixing nozzle unit has the mixing nozzle which is oriented transversely with respect to the rotational axis, with the result that the atomized cavity preserving agent can be output by means of the mixing nozzle in a radial discharge direction in relation to the rotational direction.

Here, the mixing nozzle unit has two separate feed channels which extend in the direction of the rotational axis for the cavity preserving agent and for gas for the purpose of atomization, through which feed channels the cavity preserving agent and the atomization gas are conducted separately as far as the mixing nozzle. As a result, the requirement of an early atomization in the non-rotatable part of the cavity preserving device is avoided. This is significant, since, in particular in the case of a very fine atomization or a nebulization, the feed of the atomized or nebulized cavity preserving agent as far as a discharge opening entails the risk of functional disruptions if the atomized cavity preserving agent is deposited on walls of the feed channels.

It is therefore provided in the case of a mixing nozzle unit according to the invention that the separate feed channels have deflection sections, in which the fed cavity preserving agent and the fed gas are deflected from an axial flow direction for the purpose of the subsequent atomization into a radial flow direction separately from one another. The mixing and, as a result, the atomization of the cavity preserving agent take place only on the other side of this deflection. As has already been mentioned above, this can take place in an internal mixing and atomization chamber or externally.

For this purpose, the two feed channels preferably open, in particular, into said preferably at least two outlet openings, of which one is connected to the feed channel for gas, and of which one is connected to the feed channel for cavity preserving agent. In particular, the outlet opening for the cavity preserving agent is preferably arranged centrally and is surrounded by the gas outlet opening or the gas outlet openings. In particular, this can be a gas outlet opening which surrounds the outlet opening for the cavity preserving agent in an annular manner.

In particular, the mixing nozzle unit is preferably of modular configuration, with the result that it has at least two parts which can be disconnected from another simply and of which one forms the coupling device for fastening to the rotor unit and preferably the predominant part of the stem, whereas the other part comprises at least the mixing nozzle. A design of this type allows the comparatively complex and expensive mixing nozzle to be used in different configurations and, in particular, with stems of different length and therefore a different maximum dipping depth.

In order to facilitate the handling of a mixing nozzle unit according to one aspect of the invention, it preferably has an orientation marking at the proximal end, with the result that the orientation of the mixing nozzle can be seen from the outside even in the case of a mixing nozzle unit which is inserted partially into the opening of the hollow body. It is likewise advantageous for the purpose of facilitated handling if the mixing nozzle unit has a scale or markings along its elongate stem, with the result that a dipping depth of the mixing nozzle unit into the hollow body can be seen from the outside.

In addition to the mixing nozzle unit per se, the invention also relates to a cavity preserving device for the application of a protective layer consisting of a cavity preserving agent on the inner side of a hollow body. Said cavity preserving device has a discharge device with a rotor unit which can be rotated about a rotational axis. Said rotor unit has a coupling device for coupling a mixing nozzle unit of the described type.

Said discharge device, to which the mixing nozzle unit is fastened rotatably, comprises channels for feeding gas and cavity preserving agent. Furthermore, it preferably comprises a motor for driving the rotor unit, to which the mixing nozzle unit is fastened exchangeably.

The discharge device is preferably provided for the purpose of being fastened to the robot arm of a robot and, for this purpose, has a coupling device which is provided to this end. Said coupling device is preferably designed in such a way that the feed channels for gas and/or for cavity preserving agent and/or control lines for the pneumatic or electric supply of an outlet valve or electric motor for driving the rotor unit are also connected by way of coupling of the discharge unit.

Accordingly, the discharge device preferably comprises at least one valve which serves to control, in particular, the feed of cavity preserving agent to the mixing nozzle unit. As has already been described, this can be a valve which permits merely the opening and closing of the feed channel, or a metering valve which permits either a plurality of discrete opening states or, as a continuously adjustable valve, permits any desired opening states.

Furthermore, the discharge device preferably comprises said motor, in particular in the form of an electric motor. If the latter is to be operated at a variable speed in the abovementioned way, a control operation to this end preferably takes place by way of a central controller of the robot, to the arm of which the discharge device is attached.

BRIEF DESCRIPTION OF THE DRAWINGS

Further advantages and aspects of the invention result from the following description of preferred exemplary embodiments of the invention which are described in the following text on the basis of the figures.

FIGS. 1 to 3 show a discharge device according to the invention with a mixing nozzle unit according to the invention in different perspectives.

DETAILED DESCRIPTION OF THE EXEMPLARY EMBODIMENTS

Figures 4, 5:
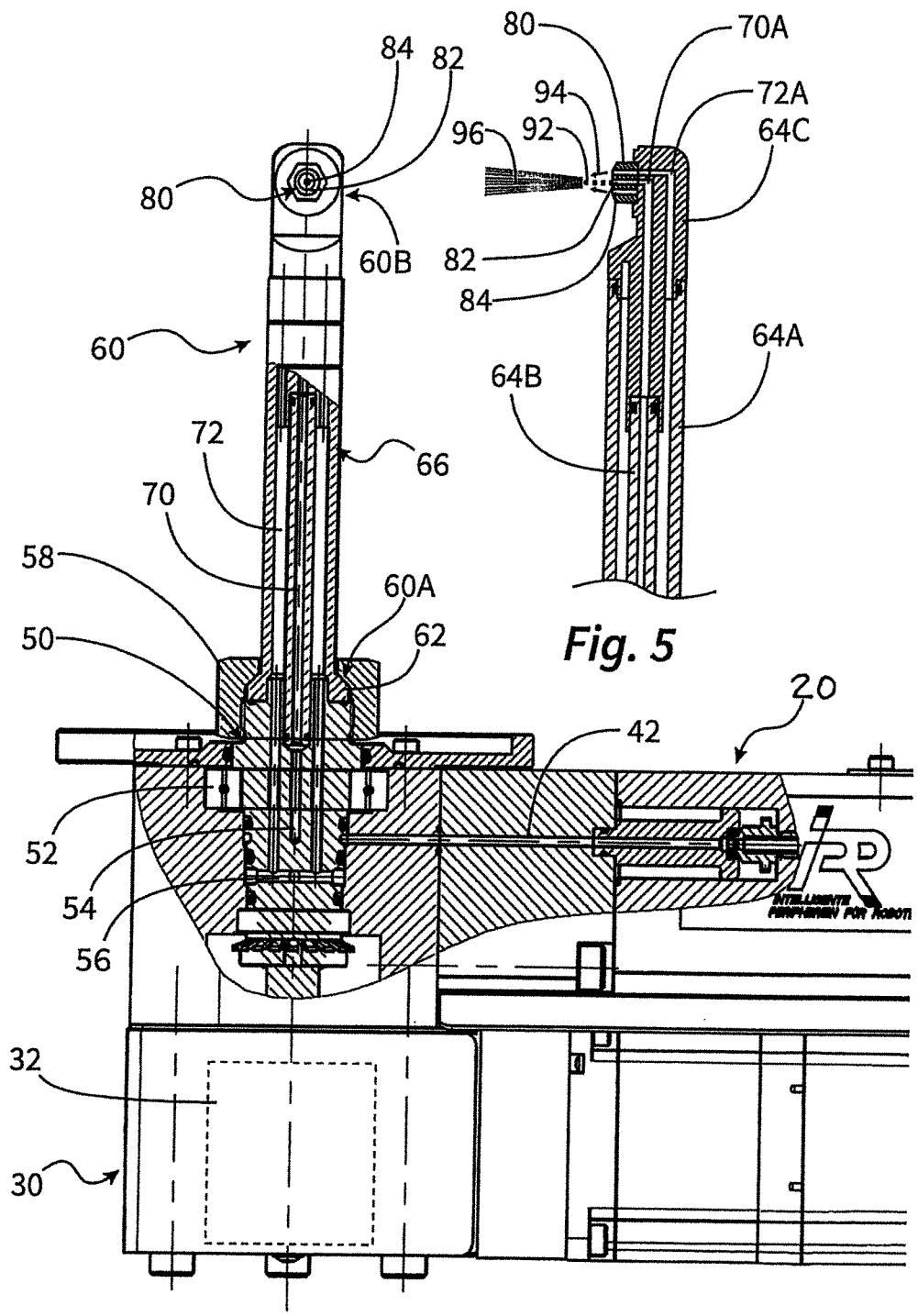
FIGS. 4 and 5 show the discharge device of the above figures in a partially sectioned and sectioned illustration, respectively.

FIG. 1 shows a discharge device 20 which is the core component of a cavity preserving device 10. In the case of the present exemplary embodiment, said discharge device 20 is provided for coupling to a robot arm 14 and, for this purpose, has a coupling device 24 which also comprises supply and control lines in a way which is still to be described in the further text.

The discharge device 20 has a rotational drive unit 30 with an internal electric motor (not shown in FIG. 1) which is provided for the purpose of it being possible for a rotatable rotor unit 50 to be rotated about a rotational axis 2. Here, the electric motor 32 can rotate the rotor unit 50 not only to a limited extent between two end positions, but rather freely about 360° and further in an endless manner.

For the purpose of the discharge of cavity preserving agent, the discharge device 20 has a mixing nozzle unit 60 which is attached by means of a nut 58 fixedly to the rotor unit 50 for conjoint rotation. The mixing nozzle unit 60 has an elongate stem 66, the proximal end 60A of which is fixed by way of the nut 58. A mixing nozzle 80 is provided at the distal end 60B of the mixing nozzle unit 60, which mixing nozzle 80 is oriented in the radial direction, with the result that fluid which is discharged here is discharged in a discharge direction which encloses approximately an angle of 90° with respect to the rotational axis 2. Depending on the application, smaller angles can also be provided, for example 60° and more.

With reference to FIG. 2, the coupling device 24 can be seen clearly. It is provided in the abovementioned way with connectors 26, through which cavity preserving agent, compressed air, electric energy and control signals are transmitted.

FIGS. 4 and 5 show the discharge device 20 and the mixing nozzle unit 60 in an enlarged and sectioned illustration. In the region of the mixing nozzle unit 60, the discharge device 20 has the rotational drive unit 30 which comprises an electric motor 32 (shown merely diagrammatically in FIG. 4). Said electric motor 32 is provided for driving the rotor 50 which, at its upper end, has a thread, by means of which the nut 58 is screwed fixedly to the rotor 50. As can be seen in FIG. 4, the nut 58 has a conical inner side in a manner which corresponds to a likewise conical coupling device 62 on the part of the mixing nozzle unit 60. The rotor unit 50 is mounted rotatably by means of an anti-friction bearing 52 on a base of the discharge unit 20.

In addition to the mixing nozzle 80 itself, the mixing nozzle unit 60 consists of three main constituent parts, namely an outer pipe 64A, an inner pipe 64B and a nozzle receptacle 64C, in which the mixing nozzle 80 is fastened. This design allows simple reconfiguration of the mixing nozzle unit, by the components 64A, 64B being swapped for components of a different length. As a result, mixing nozzle units with a differing maximum dipping depth can be used. A feed channel 70 for feeding the cavity preserving agent extends within the inner pipe 64B and in a continued manner as far as into the component 64C. At its distal end, said feed channel 70 has a deflection 70A, at which inflowing cavity preserving agent is deflected out of an axial flow direction into a radial flow direction. In a similar way, a feed channel 72 is also provided between the outer side of the inner pipe 64B and the inner side of the outer pipe 64A, which feed channel 72 likewise continues as far as into the component 64C and is deflected there in the radial direction in a deflection region 72A. Both fluids, the cavity preserving agent and the gas which is used for atomization, therefore pass to the mixing nozzle 80 in a manner which is already deflected in the radial direction, where, in the case of that embodiment of the mixing nozzle 80 which is shown, they are conducted to separate outlet openings 82, 84, at which they are output under pressure. As is indicated by way of the arrows 94, the discharged cavity preserving agent 92 is atomized in the process and forms a fine protective agent mist 96.

Figure 6:
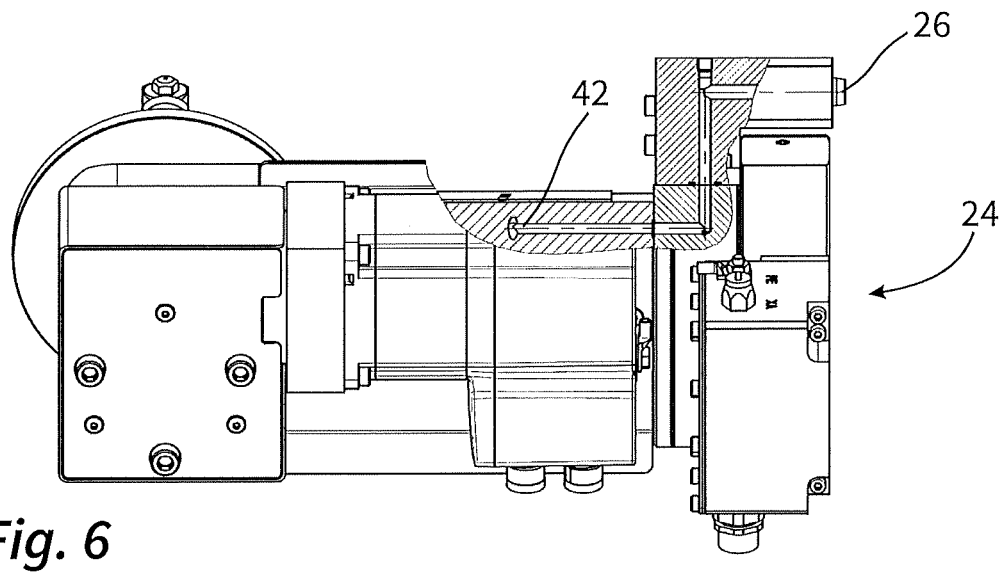
FIGS. 6 to 8 show further sections, from which the fluid feed to the mixing nozzle unit can be seen.
Figure 7:
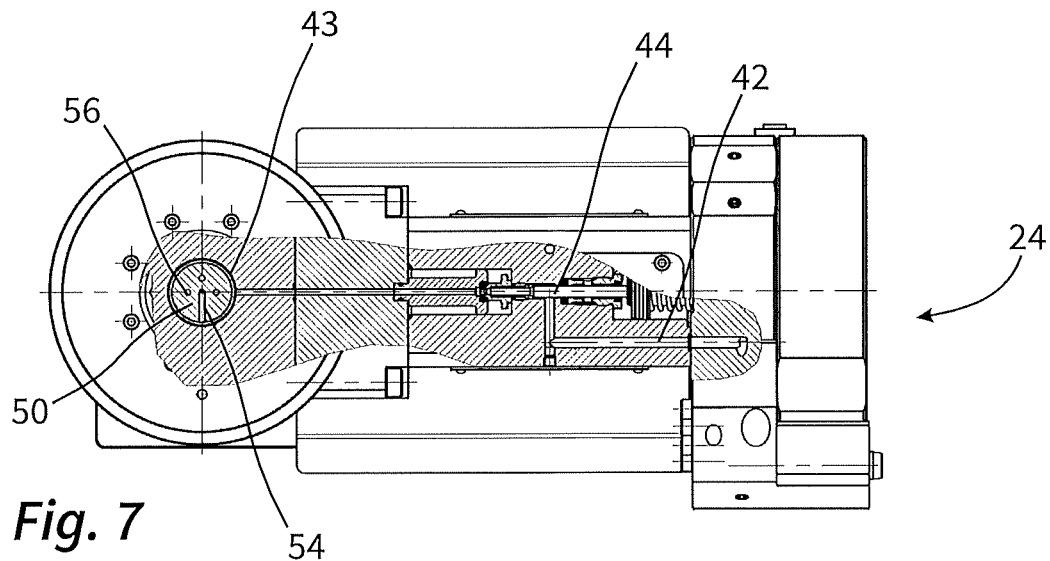
Figure 8:
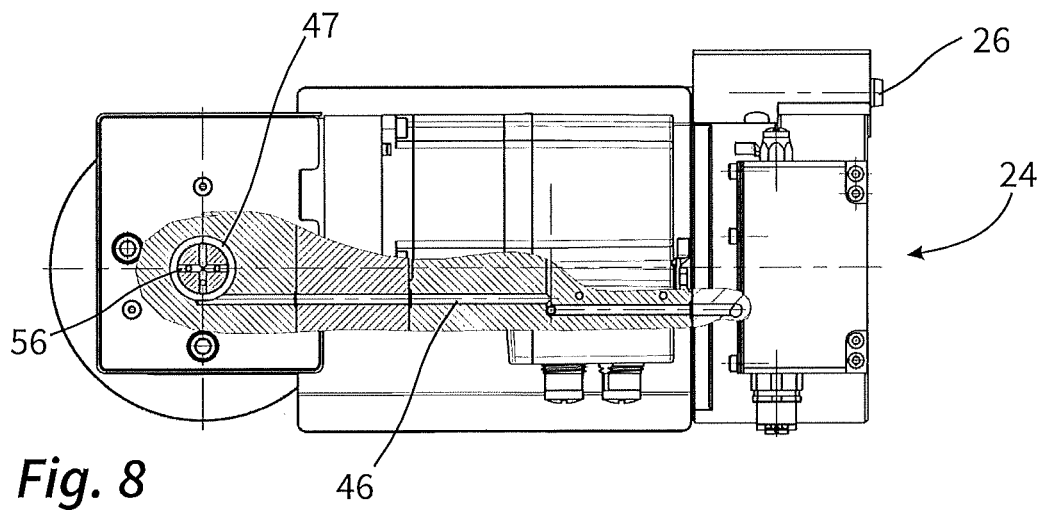

The supply of said feed channels 70, 72 takes place by way of the rotor unit 50 which, for this purpose, has a central cavity preserving agent channel 54 and, surrounding this, gas channels 56 in the way which can also be seen in the following FIGS. 6 to 8. As can be seen on the basis of FIG. 4, but also, in particular, on the basis of FIGS. 7 and 8, rotary leadthroughs 43, 47 are provided in each case, by means of which the channels 54, 56 are connected permanently to corresponding channels 42, 46 of the base. Said channels 42, 46 are supplied by said connectors 26 on the coupling device 24, a switching valve 44 being provided in the channel 42 for the cavity preserving agent, by means of which switching valve 44 the feed of cavity preserving agent can be interrupted comparatively close to the discharge opening 84. Here, the valve 44 is provided as a pneumatically switchable valve.

Figure 9:
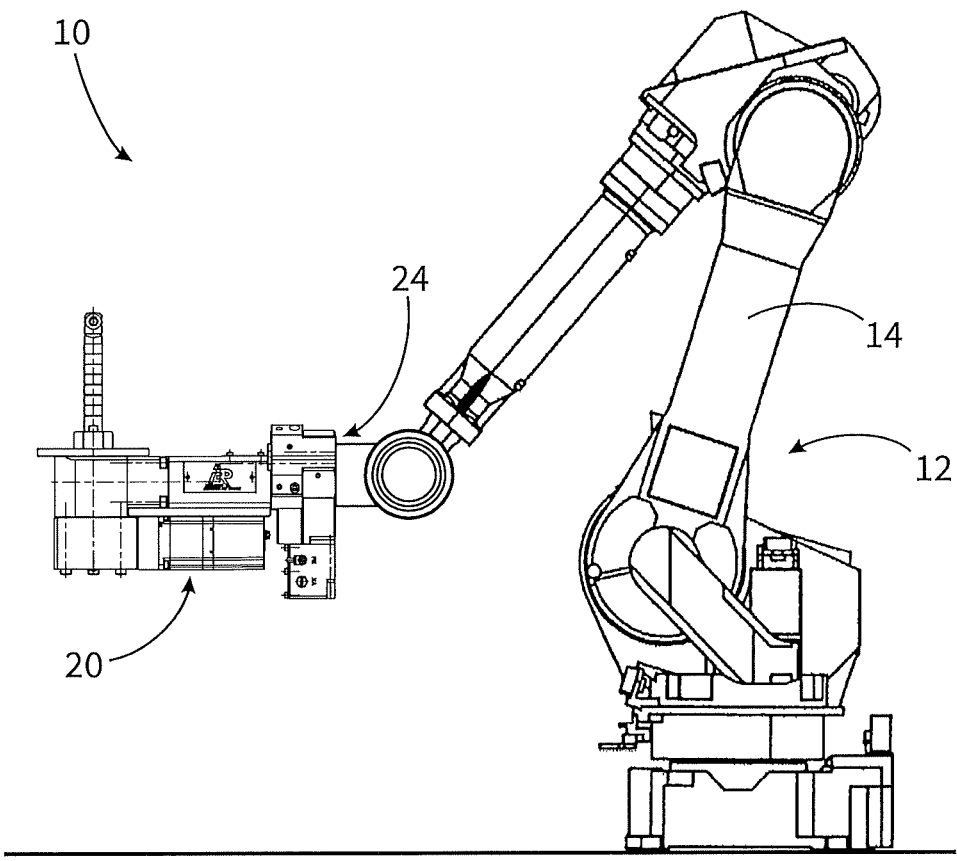
FIG. 9 shows a cavity preserving device with a robot for handling the discharge device.
Figure 10:
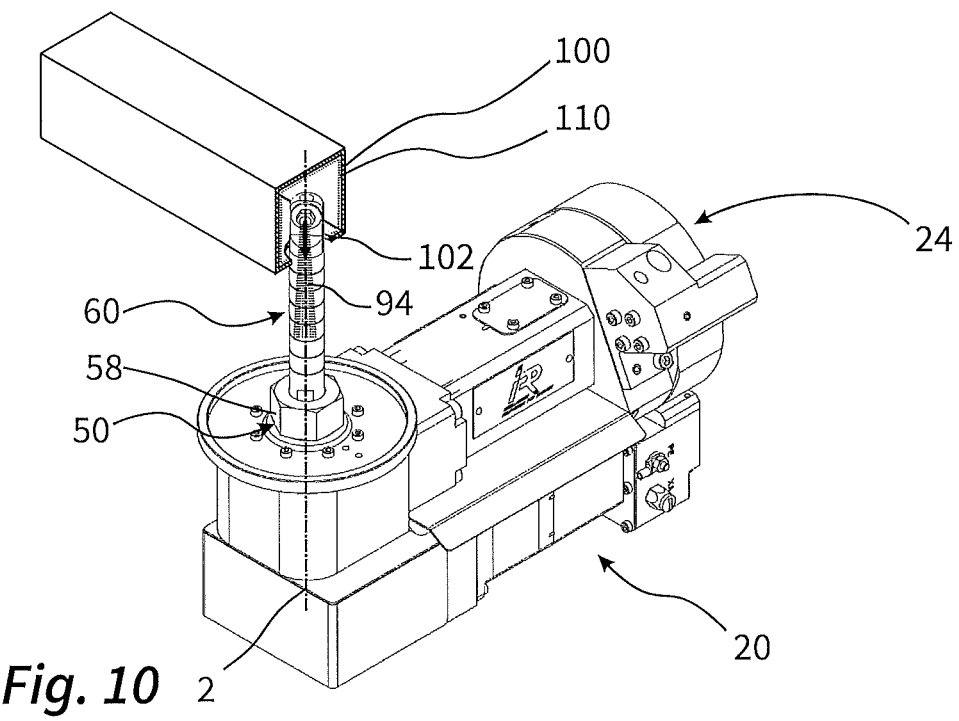
FIG. 10 clarifies the method of function of the discharge device in operation.
Figure 11:
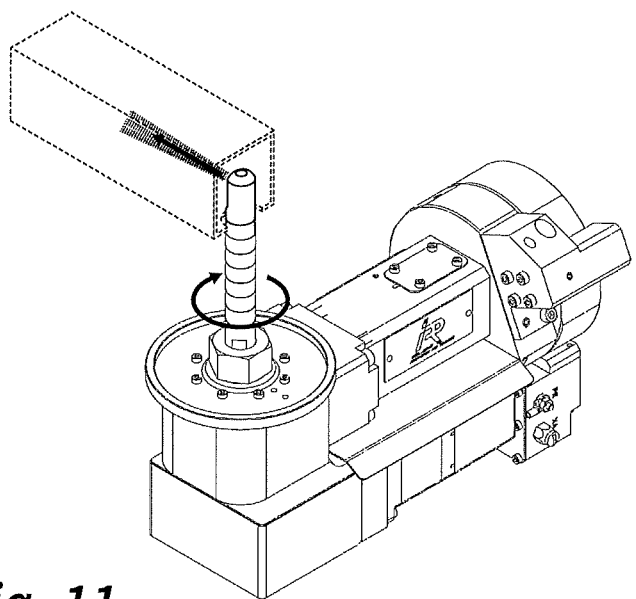
FIGS. 11 to 13 show a discharge of cavity preserving agent, which discharge is variable in a rotational angle-dependent manner.
Figure 12:
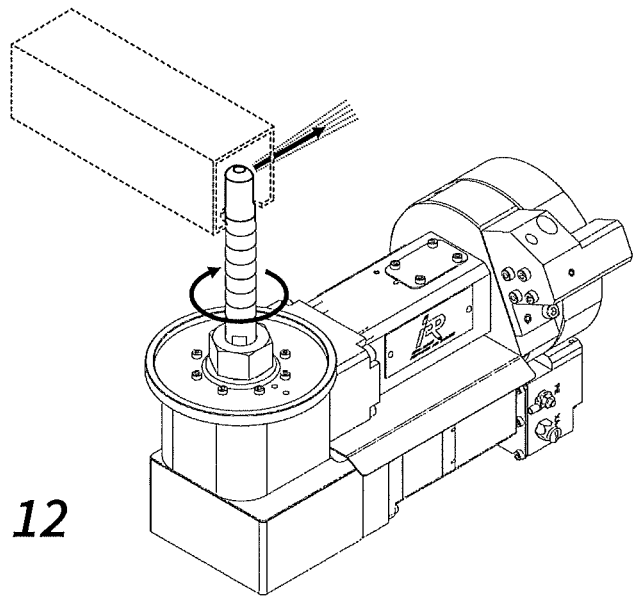
Figure 13:
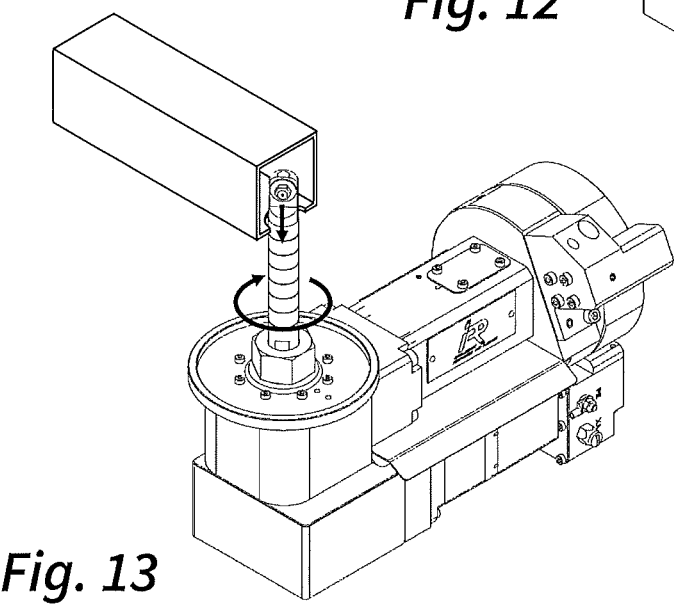

FIG. 9 shows the main use as intended of a discharge device in accordance with the preceding figures. It can be seen that the discharge device 20 is attached by way of its coupling device 24 to a robot arm 14 of a robot 12, by means of which the discharge device can be moved flexibly in three dimensions, in order, in particular, to be moved with respect to a vehicle chassis and to be moved into a working position. FIG. 10 shows a working position of this type. In the working position, the mixing nozzle unit 60 is inserted into a hollow body 100 partially through an opening 102. Here, as intended, the mixing nozzle unit 60 is rotated by means of the rotor unit 50 and the electric motor 32 with a protective agent mist being produced at the same time. Therefore, the spray mist 94 which is produced can be applied in different directions and onto all inner surfaces of the hollow body 100, resulting in a protective layer 110.

FIGS. 11 to 13 clarify this further. Here, FIG. 11 shows an orientation of the mixing nozzle in the direction of extent of the elongate hollow body 100. A particularly great quantity of protective agent mist is required in this direction, since the inner faces which are arranged in this direction are comparatively large. FIG. 12 shows an orientation at a 90° angle with respect to that of FIG. 11. In this orientation, the mixing nozzle is directed onto a comparatively near wall, with the result that the areas to be coated in this angular region are smaller. Therefore, a smaller quantity of cavity preserving agent per unit of angle is also required. FIG. 13 shows an orientation, in which no discharge at all of cavity preserving agent is desired.

There are a plurality of possibilities for achieving this result. For instance, in one variant of the method, the valve 44 can remain opened over the predominant part of a 360° rotation of the mixing nozzle unit 60, and can be closed only in the orientation of FIG. 13. In order for it additionally to be possible for the different cavity preserving agent quantity to be discharged in an angle-dependent manner in accordance with FIGS. 11 and 12, it can be provided that, at a constant rotational speed of the mixing nozzle unit 60, the valve 44 or some other electrically operated valve decreases the flow of the cavity preserving agent in the angular position of FIG. 12 in comparison with the position of FIG. 11. As an alternative, the rotational speed of the mixing nozzle unit can be considerably greater in the angular position of FIG. 12 than in the angular position of FIG. 11. Although, in the case of a procedure of this type, the mixing nozzle outputs the same quantity of cavity preserving agent per unit time in the rotational positions of FIGS. 11 and 12, the quantity of the cavity preserving agent per unit of angle is influenced by way of this variable speed.

The mixing nozzle unit 60 has an orientation marking 68A at the proximal end, with the result that the orientation of the mixing nozzle 80 can be seen from the outside even in the case of a mixing nozzle unit 60 which is inserted partially into the opening of the hollow body 100. Further, the mixing nozzle unit 60 has a scale 68B or markings along its elongate stem, with the result that a dipping depth of the mixing nozzle unit 60 into the hollow body 100 can be seen from the outside.

The invention claimed is:

1. A method for preserving cavities of a hollow motor vehicle part, the method comprising:

providing a mixing nozzle unit having a proximal end coupled to a rotor unit for rotation about a rotational axis, the mixing nozzle unit having, at a distal end, a mixing nozzle oriented radially with respect to the rotational axis, the mixing nozzle unit having two separate feed channels, the two separate feed channels extending in a direction of the rotational axis and being for a cavity preserving agent and for gas for atomizing the cavity preserving agent, the cavity preserving agent and the atomization gas being conducted separately through the feed channels to the mixing nozzle, the mixing nozzle unit and the mixing nozzle being rotatable by the rotor unit about the rotational axis into a plurality of rotational positions;

inserting the mixing nozzle of the mixing nozzle unit in the direction of the rotational axis through an opening of the hollow motor vehicle part such that at least the mixing nozzle is situated within the hollow motor vehicle part;

when the mixing nozzle is positioned in at least a first one of the plurality of rotational positions, directionally discharging the cavity preserving agent in atomized form from the mixing nozzle towards a first region of an inner side of the hollow motor vehicle part and depositing the cavity preserving agent in atomized form on the first region;

when the mixing nozzle is positioned in at least a second one of the plurality of rotational positions, directionally discharging the cavity preserving agent in atomized form from the mixing nozzle towards a second region of the inner side of the hollow motor vehicle part different from the first region, and depositing the cavity preserving agent in atomized form on the second region;

rotating the mixing nozzle unit and the mixing nozzle with the rotor unit about the rotational axis within the hollow motor vehicle part during the steps of directionally discharging; and varying a feed amount of the cavity preserving agent in atomized form supplied to the mixing nozzle when the mixing nozzle is in the at least the first one of the plurality of rotational positions and when the mixing nozzle is in the at least the second one of the plurality of rotational positions to apply different amounts of the cavity preserving agent in atomized form onto the first and second regions of the hollow motor vehicle part.

2. The method of claim 1, further comprising maintaining a constant rotational speed of the mixing nozzle unit and the mixing nozzle during the step of rotating.

3. The method of claim 1, further comprising atomizing the cavity preserving agent by feeding atomization gas to one of the feed channels of the mixing nozzle unit to nebulize the cavity preserving agent.

4. A method for preserving cavities of a hollow motor vehicle part, the method comprising:

providing a mixing nozzle unit having a proximal end coupled to a rotor unit for rotation about a rotational axis, the mixing nozzle unit having, at a distal end, a mixing nozzle oriented radially with respect to the rotational axis, the mixing nozzle unit having two separate feed channels, the two separate feed channels extending in a direction of the rotational axis and being for a cavity preserving agent and for gas for atomizing the cavity preserving agent, the cavity preserving agent and the atomization gas being conducted separately through the feed channels to the mixing nozzle, the mixing nozzle unit and the mixing nozzle being rotatable by the rotor unit about the rotational axis into a plurality of rotational positions;

inserting the mixing nozzle of the mixing nozzle unit in the direction of the rotational axis through an opening of the hollow motor vehicle part such that at least the mixing nozzle is situated within the hollow motor vehicle part;

rotating the mixing nozzle unit and the mixing nozzle with the rotor unit about the rotational axis within the hollow motor vehicle part;

directionally discharging the cavity preserving agent in atomized form from the mixing nozzle towards an inner side of the hollow motor vehicle part and depositing the cavity preserving agent on the inner side during the step of rotating; and during the step of rotating, interrupting a feed of the cavity preserving agent in atomized form to the mixing nozzle when the mixing nozzle is positioned in at least one of the plurality of rotational positions such that no cavity preserving agent in atomized form is directionally discharged and deposited onto part of the inner side of the hollow motor vehicle part.

5. A method for preserving cavities of a hollow motor vehicle part, the method comprising:

providing a mixing nozzle unit having a proximal end coupled to a rotor unit for rotation about a rotational axis, the mixing nozzle unit having, at a distal end, a mixing nozzle oriented radially with respect to the rotational axis, the mixing nozzle unit having two separate feed channels, the two separate feed channels extending in a direction of the rotational axis and being for a cavity preserving agent and for gas for atomizing the cavity preserving agent, the cavity preserving agent and the atomization gas being conducted separately through the feed channels to the mixing nozzle, the mixing nozzle unit and the mixing nozzle being rotatable by the rotor unit about the rotational axis into a plurality of rotational positions;

inserting the mixing nozzle of the mixing nozzle unit in the direction of the rotational axis through an opening of the hollow motor vehicle part such that at least the mixing nozzle is situated within the hollow motor vehicle part;

when the mixing nozzle is positioned in at least a first one of the plurality of rotational positions, directionally discharging the cavity preserving agent in atomized form from the mixing nozzle towards a first region of an inner side of the hollow motor vehicle part and depositing the cavity preserving agent in atomized form on the first region;

when the mixing nozzle is positioned in at least a second one of the plurality of rotational positions, directionally discharging the cavity preserving agent in atomized form from the mixing nozzle towards a second region of the inner side of the hollow motor vehicle part different from the first region, and depositing the cavity preserving agent in atomized form on the second region;

rotating the mixing nozzle unit and the mixing nozzle with the rotor unit about the rotational axis within the hollow motor vehicle part during the steps of directionally discharging; and varying a rotational speed of the mixing nozzle unit and the mixing nozzle when the mixing nozzle is in the at least the first one of the plurality of rotational positions and when the mixing nozzle is in the at least the second one of the plurality of rotational positions to apply different amounts of the cavity preserving agent in atomized form onto the first and second regions of the hollow motor vehicle part.

6. The method of claim 5, further including maintaining a constant feed amount of the cavity preserving agent in atomized form supplied to the mixing nozzle during the step of rotating.

7. The method of claim 5, wherein the step of rotating includes continuously rotating the mixing nozzle unit and the mixing nozzle with the rotor unit about the rotational axis through at least one rotational cycle of the mixing nozzle unit and the mixing nozzle.

* * * * *